July 24, 1951     J. J. HENNESSY     2,561,983
BEARING LUBRICATOR
Filed April 27, 1948
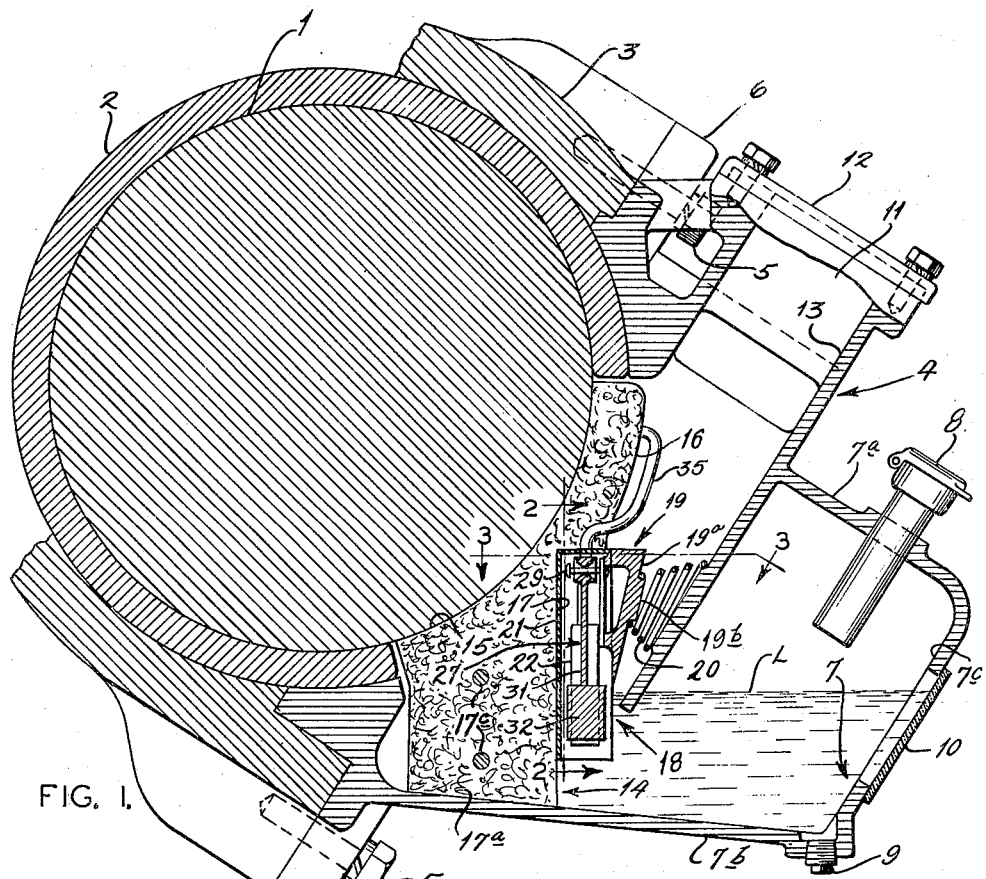
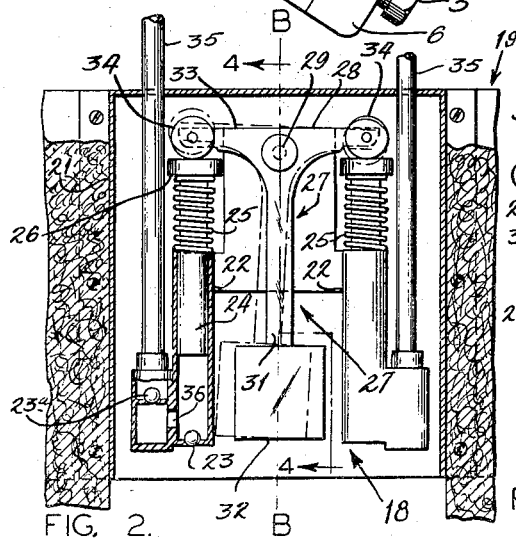
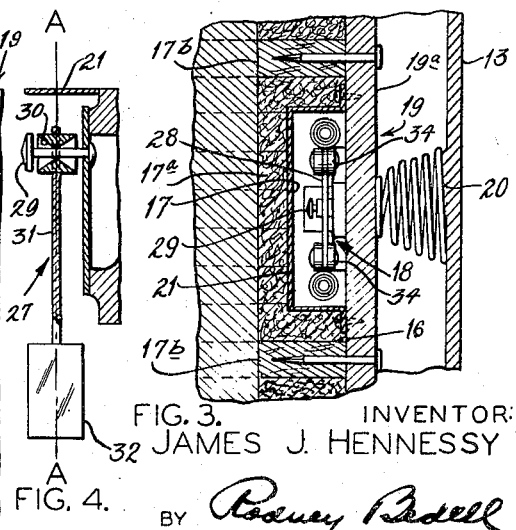
INVENTOR:
JAMES J. HENNESSY
BY Rodney Bedell
ATTORNEY.

Patented July 24, 1951

2,561,983

UNITED STATES PATENT OFFICE 2,561,983

BEARING LUBRICATOR

James J. Hennessy, Montclair, N. J.

Application April 27, 1948, Serial No. 23,600

10 Claims. (Cl. 308—121)

The invention relates to lubricators for pumping lubricant from a reservoir to a bearing and more particularly to lubricators of the type used for lubricating railway vehicle motor housing bearings on axles.

One object of the invention is to pump the oil from a reservoir to a distributor having a journal-engaging face elevated above the normal level of lubricant in the reservoir. The lubricant pump is actuated by a lever device which swings in response to sudden lateral and longitudinal movements of the pump. Such lateral movement may be caused by track irregularities, alternate tangent and curved track and other conditions. Such sudden longitudinal movement may be cuased by rapid acceleration and deceleration of the vehicle.

The lever device is weighted so that its inertia makes it less susceptible to sudden movements of the pump than its support, thereby causing relative movement between the device and its support to pump lubricant to the distributor.

Another object is to facilitate insertion and removal of a lubricator device into and from the space adjacent the journal without removing the journal from a housing and to readily disassemble the pump after removal so that the pump may be easily cleaned or repaired.

Other objects will be apparent to those skilled in the art from the following description and accompanying drawings, in which:

Figure 1 is a transverse vertical section through a journal and a housing bearing thereon and shows a lubricator, including a pump, constructed according to the invention.

Figure 2 is a vertical section through the pump taken at right angles to Figure 1 and approximately on the line 2—2 of Figure 1 and drawn to enlarged scale.

Figure 3 is a horizontal section taken approximately on the line 3—3 of Figure 1 and drawn to enlarged scale.

Figure 4 is a detail vertical section through the pump taken approximately on the line 4—4 of Figure 2 and shows the pendulum pivot.

The journal 1 mounts a bearing 2 received in a bearing housing 3. A cap 4 is secured to bearing housing 3 by screws 5 extending through lugs 6 on the cap. The cap forms a reservoir 7 which contains lubricant L. The reservoir has a lubricant filling inlet 8 in its top wall 7a, a drain plug 9 in its bottom wall 7b and a window 10 in its side wall 7c. An inclined passageway 11 opens upwardly of reservoir 7 and has an inclined wall 13 extending a substantial distance inwardly of the reservoir. Passageway 11 normally is closed by a cover plate 12.

A distributor 14 rests on bottom wall 7b of reservoir 7 and has a forward journal engaging face 15 extending between the ends of bearing 2 and above the normal level of lubricant in reservoir 7. Distributor 14 may be constructed of layers 17a of felt or other lubricant absorbing material, and several layers 17b of plywood, substantially the same shape as felt layers 17a, may be interspersed between the felt layers to add to the rigidity of the distributor. The respective layers may be maintained in assembly by transverse pins 17c.

A wedge-shaped plate 19 may be secured to the rear face 16 of distributor 14 by elements penetrating the plywood layers 17b although the securing elements are not essential. The rear face 19a of plate 19 is inclined to the vertical and to wall 13 and has a seat 19b for one end of a compression spring 20, the other end of spring 20 being seated on wall 13. Spring 20 urges distributor 14 into engagement with journal 1.

A pump 18 supplies lubricant from reservoir 7 to the distributor for lubricating the journal bearing. Pump 18 is secured to plate 19 and is positioned in an angular recess 17 in the distributor rear face 16. Pump 18 includes a housing 21 and a pair of cylinders 22 each having an inlet ball valve 23 at its lower end below the lubricant level in reservoir 7. A piston 24 reciprocates in each cylinder 22 and is urged upwardly away from valve 23 by a compression spring 25 coaxial with piston 24 and seated at one end on the upper end of cylinder 22 and at the other end on an enlarged head 26 on piston 24. Discharge pipes 35 to have outlet ball valves 23a and communicate with cylinders 22 through ports 36 and lead to distributor 14.

The lever device initiating action of the pistons comprises a pendulum 27 which includes a substantially T-shaped member 28 swinging in substantially all vertical planes on a horizontal pivot 29 in the pump housing between cylinders 22. The pendulum pivot bearing is undercut at 30 and makes substantially live contact with pivot 29 to enable pendulum 27 to rock laterally on pivot 29 to either side of plane A (Figure 4) as well as to rotate thereon to either side of plane B (Figure 2). Depending leg 31 of the T-shaped member 28 has a weight 32 at its lower end which may be immersed in the lubricant to damp its swinging movement. Cross arm 33 of member 28 has a roller 34 secured to each of its ends and engaging the associated piston head 26. Rollers 34 extend to either side of plane A so that when pendulum 27 rocks to either side of plane A in response to sudden longitudinal movement of the pump, both pistons 24 move downwardly into cylinders 22 and force lubricant into both discharge pipes 35. When weight 32 moves back to its normal position in plane A, springs 25 will move pistons 24 outwardly of the cylinders and thereby cause lubricant to be sucked through valves 23 into cylinders 22.

When pendulum 27 rotates about its pivot 29 to either side of plane B in response to sudden transverse movements of the pump, one end of arm 33 moves downwardly and moves the associated piston 24 inwardly of the cylinder to force lubricant into pipe 35 and the other end of the arm moves upwardly and releases its piston and lubricant is sucked into the cylinder as spring 25 moves the piston upwardly. When pendulum 27 swings back to its original position, the latter piston is moved inwardly in the cylinder to force lubricant into pipe 35 and the former piston is released to suck oil into the associated cylinder.

As pendulum 27 swings to and fro due to sudden transverse and longitudinal movements of the pump, lubricant is pumped from reservoir 7 through pipes 35 to distributor 14 to lubricate the journal bearing. If desired, the lever device initiating action of the pistons may extend upwardly with weight 32 above pivot 29.

Pump 18 and distributor 14 may be applied to or removed from the journal after removing cap 4 from bearing housing 3. The pump and distributor may be inspected and adjusted through passageway 11.

While the above description is explicit as to some of the details of the structure, it will be understood that these details are not essential to all embodiments of the invention but the structure may be modified substantially without departing from the spirit of the invention and the exclusive use of such modifications, as come within the scope of the claims, is contemplated.

What is claimed is:

1. In a lubricator, a pump including a cylinder, a piston reciprocable in said cylinder and having an enlarged head, a pivot, and a weighted member mounted on said pivot for swinging movement in planes at right angles to one another and having a transverse portion engaging said piston head and approximately the same length as the diameter of the piston head, said member actuating said piston as said member swings in either of said planes.

2. In an axle lubricating structure, a reservoir for lubricant having an inner wall inclined to the vertical, a distributor having a journal engaging face, a pump for supplying lubricant from the reservoir to the distributor for lubricating the journal bearing, a wedge-shaped plate associated with said distributor and said pump, and a compression spring between said plate and said wall and urging said distributor into engagement with the journal.

3. In an axle lubricating structure, a reservoir for lubricant having an inner wall inclined to the vertical, a distributor having a front journal engaging face above the normal level of lubricant in the reservoir and having a rear face with an angular recess, a pump received in said recess and positioned between said distributor and said wall, a wedge-shaped plate associated with said distributor and secured to said pump, and a compression spring seated at one end on said wall and at the other end on said plate and urging said distributor into engagement with the journal.

4. In an axle lubricating structure, a reservoir for lubricant having an inner wall, a distributor having a journal engaging face above the normal level of lubricant in the reservoir and having a depending portion resting on the bottom of the reservoir, a pump supported by said distributor and for supplying lubricant from the reservoir to the distributor journal engaging face, and a compression spring between said wall and said distributor urging said distributor into engagement with the journal.

5. In an axle lubricating structure, a reservoir for lubricant, a passage opening outwardly of said reservoir and having an inner wall inclined to the vertical, a distributor having a journal engaging face, a pump for supplying lubricant from the reservoir to the distributor for lubricating the journal bearing, and a wedge-shaped plate having one of its faces secured to said distributor and said pump and having another of its faces inclined to the vertical and to said wall, and a compression spring between said wall and said inclined face and urging said distributor into engagement with the journal.

6. In an axle lubricating structure, a reservoir for lubricant, a distributor having a journal engaging face, a pump for supplying lubricant from the reservoir to the distributor for lubricating the journal bearing and including a pair of cylinders with their axes positioned substantially vertically, a piston reciprocable in each of said cylinders, and a pivoted substantially T-shaped member to move said pistons in said cylinders and having a weighted leg and having a cross arm engaging said pistons, said member being pivotally supported in a substantially upright position at the junction of the leg and cross-arm.

7. In a lubricator, a pump including a housing and a pair of cylinders, a piston reciprocable in each of said cylinders, a pivot on said housing between said cylinders, a substantially T-shaped member having a weighted leg and mounted on said pivot substantially at the middle of its cross-arm with the end portions of the cross-arm of the T engaging said pistons, said member being arranged to swing on said pivot in planes at angles to one another and moving said pistons in said cylinders as said member swings in said planes.

8. In a lubricator, a pump including an upright cylinder, a piston reciprocable in said cylinder, a weight suspended from the pump structure, a pivot for said weight with its axis extending transversely of said cylinder, another pivot for said weight with its axis extending transversely to the axis of the first-mentioned pivot and a connection between said weight and said piston for moving the latter in said cylinder.

9. In a lubricator, a pump structure including a cylinder, a valve at one end of said cylinder, a piston reciprocable in said cylinder, a spring thrusting said piston away from said valve, a weighted member suspended from said pump structure on pivots with horizontal axes disposed susbtantially at right angles to each other, and means operatively connecting said weighted member to said piston to move the latter toward said valve against the thrust of said spring as said weighted member swings in one direction on either of said pivots.

10. In a railway journal lubricator, a pump structure including an upright cylinder, a piston reciprocable in said cylinder, a spring thrusting said piston axially of said cylinder, a horizontal pivot pin mounted on said structure spaced from the axis of said piston, and a weighted member having a spool-shaped part mounted on said pivot pin in providing for swinging movement of said member on said pin in substantially vertical planes at angles to each other and means connecting said weighted member and said piston and moving said piston in said cylinder against the thrust of said member as said member swings in one direction of either of said planes.

JAS. J. HENNESSY.

REFERENCES CITED

The following references are of record in the file of this patent:

UNITED STATES PATENTS

| Number | Name | Date |
| --- | --- | --- |
| 113,641 | Dunham | Apr. 11, 1871 |
| 352,171 | Wendell | Nov. 9, 1886 |
| 1,265,199 | Hennessy | May 7, 1918 |
| 1,444,461 | Hennessy | Feb. 6, 1923 |
| 1,658,196 | Hennessy | Feb. 7, 1928 |